United States Patent [19]

Pond, Jr.

[11] 4,286,644
[45] Sep. 1, 1981

[54] REPLACEABLE TREAD TIRES

[75] Inventor: James W. Pond, Jr., Doylestown, Ohio

[73] Assignee: The B. F. Goodrich Company, Akron, Ohio

[21] Appl. No.: 120,020

[22] Filed: Feb. 11, 1980

Related U.S. Application Data

[63] Continuation of Ser. No. 905,252, May 12, 1978, abandoned.

[51] Int. Cl.³ .............................................. B60C 11/02
[52] U.S. Cl. ................................ 152/354 R; 152/176; 152/188; 152/361 R
[58] Field of Search ............... 152/175, 176, 177, 185, 152/187, 188, 189, 354 R, 357 R, 361 R, 362 R

[56] References Cited

U.S. PATENT DOCUMENTS

| 2,826,233 | 3/1958 | Cooper | 152/361 R |
|---|---|---|---|
| 3,133,583 | 5/1964 | Dobson | 152/354 |
| 3,224,481 | 12/1965 | Lugli | 152/176 |
| 3,224,482 | 12/1965 | Barassi et al. | 152/176 |
| 3,240,249 | 3/1966 | Lugli | 152/176 |
| 3,490,510 | 1/1970 | Maiocchi | 152/187 |
| 3,831,656 | 8/1974 | Senger | 152/361 FP |
| 4,019,551 | 4/1977 | Kolowski | 152/354 |
| 4,034,789 | 7/1977 | Curtiss, Jr. | 152/187 |

FOREIGN PATENT DOCUMENTS 767378  1/1957  United Kingdom .............. 152/362 R Primary Examiner—John E. Kittle
Attorney, Agent, or Firm—Michael J. Colitz, Jr.

[57] ABSTRACT

A pneumatic tire having a carcass portion and a readily replaceable tread portion. The tread portion is provided with a zero ply steer belting and built-up edges. The carcass is of an elliptical cross-section. The interface between the carcass and tread is of a high radius of curvature, all of which when taken together, provides for an effective combination and practical replaceable tread tire.

1 Claim, 3 Drawing Figures

REPLACEABLE TREAD TIRES

This is a continuation, of application Ser. No. 905,252, filed May 12, 1978, now abandoned.

BACKGROUND OF THE INVENTION

Pneumatic tires may be considered or constructed of two major parts. The main portion or carcass includes beads adjacent the area where it is mounted upon the wheel. The carcass also has sidewalls extending from the beads to a crown portion. The second major portion of a tire is the tread mounted on the crown and made of a less abrasion resistant rubber. During normal use, the tread will become worn more quickly than the carcass whereafter the carcass can be retreaded with new tread portion. Alternately, the entire tire can be discarded or recycled for the generation of a new tire or other rubber product.

The concept of replacing worn treads without vulcanization offers many advantages. The most significant advantage is the time and cost savings. Since the life of the carcass is several times longer than the life of the tread, replaceable treads can extend the life and utility of a normal tire. They also permit the changing of tread design for a particular usage of the vehicle upon which the tire is mounted. Replaceable treads are also advantageous in that the tread can be replaced upon a carcass without the carcass being removed from the vehicle upon which it is mounted. This has a particular benefit in applications such as off the road uses. More specific benefits are found in the aircraft industry wherein plural tires are mounted on a common axle. In such situations, an inboard tire tread can be replaced without removing the exterior tire from the axle. This is done by merely deflating both tires and replacing the new tread on the inboard tire first.

There have been many approaches to removable tread tires in the past. Some approaches are described in U.S. Pat. Nos. 2,874,742; 3,750,733; and 4,050,495. These patents illustrate a long-standing appreciation for the need of a removable tread tire. The fact that removable tread tires have not met with commercial success illustrates deficiencies in the prior art approaches.

SUMMARY OF THE INVENTION

Tires for replaceable tread applications constructed in accordance with the instant invention consist of two separately manufactured principal components. One of these components is the relatively permanent carcass provided with rim engaging beads and with a plurality of plies of reinforcing materials, such as ply cords embedded in rubber, of sufficient extent to create a proper shape, dimension and strength when inflated for use. The sidewalls extend radially outwardly from the beads to define a wide oval cross-section extending to a relatively flat crown portion. The side edges of the crown are built up to give a smooth, continuous, relatively flat, high radius of curvature surface for removably receiving the replaceable tread.

The second major component is the band-shaped replaceable tread which has a smooth inner surface contactable and mating with the crown portion of the carcass. The edges of the tread portion are built up relative to its central portion to simulate the relatively flat, high radius of curvature, cross-sectional configuration of the interface between these two mating components. The tread portion is constructed of an abrasion resistant rubber, reinforced with cords at 0°, measured from the direction of rotation of the tire assembly, to create a zero ply steer orientation. This orientation decreases the tendency of the tread band to shift laterally during straight ahead movement of the vehicle upon which the tire assembly is mounted. Ply orientation of this type is described in U.S. Pat. No. 3,945,422. A tire assembly of this type results in even pressure from the carcass across the crown to evenly distribute a holding pressure to the tread mounted thereon.

In order to gain a better understanding of the invention as well as other advantages and further features thereof, reference is made to the following detailed description of the invention to be read in conjunction with the accompanying drawings forming a part of this application.

DESCRIPTION OF THE PREFERRED EMBODIMENT

Figure 1:
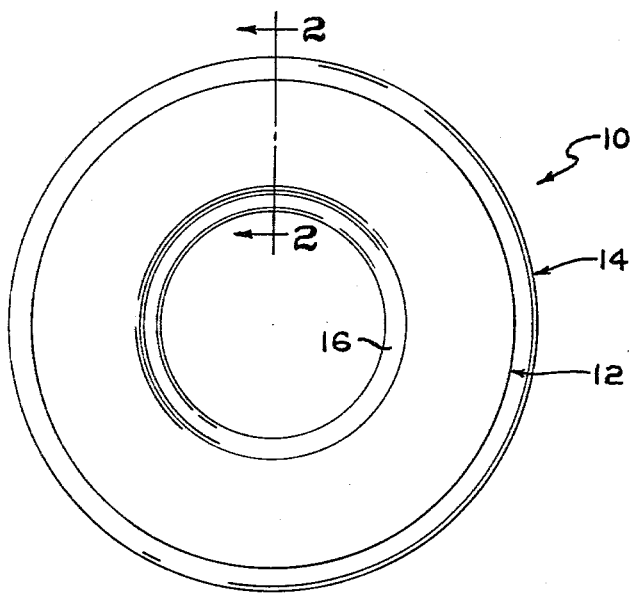
FIG. 1 is a side elevational view of a tire carcass and replaceable band mounted thereon which are constructed in accordance with the teachings of this invention.
Figure 2:
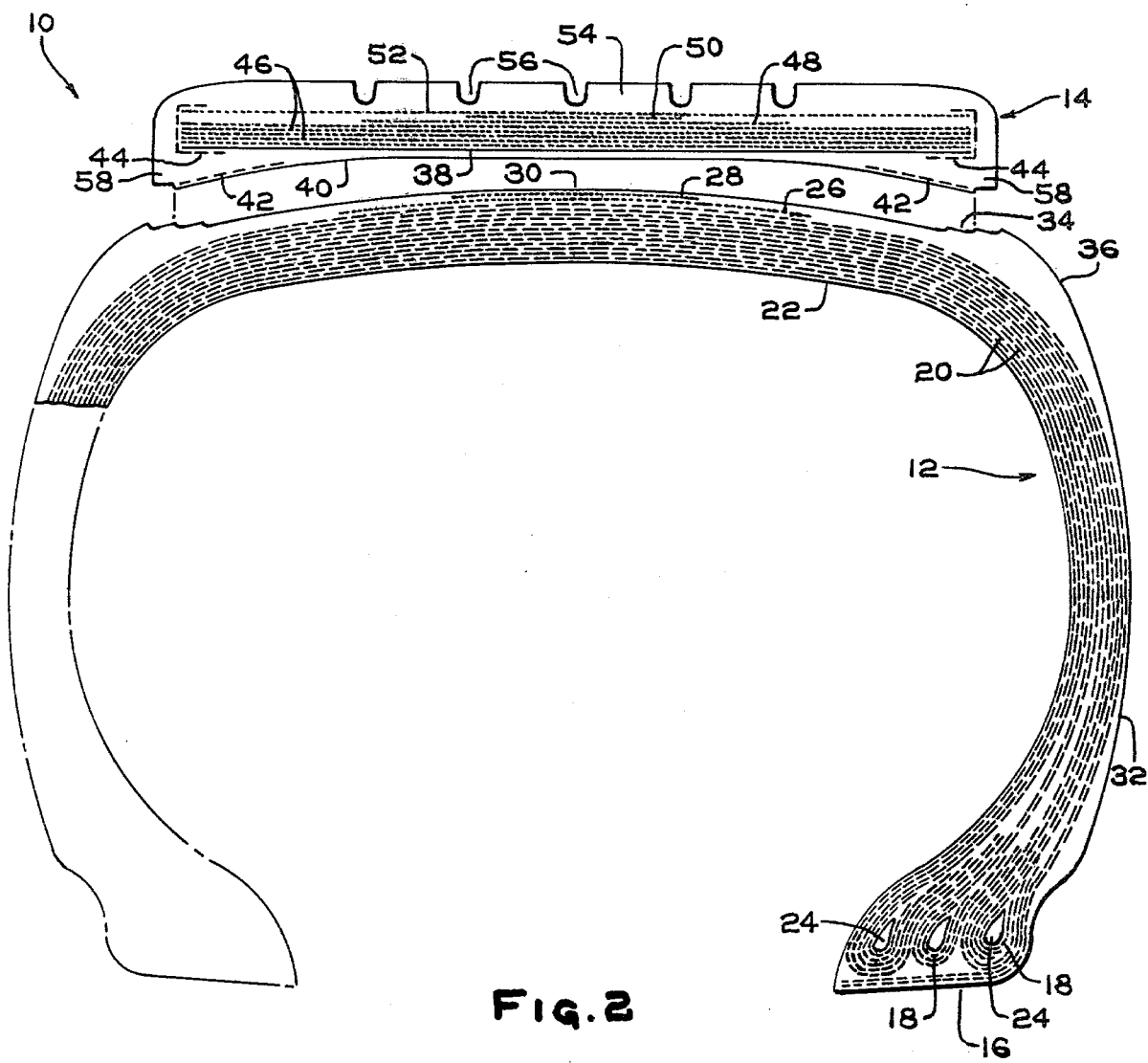
FIG. 2 is an exploded sectional view of the assembly of FIG. 1 taken along line 2—2 of FIG. 1 showing internal constructions thereof.
Figure 3:
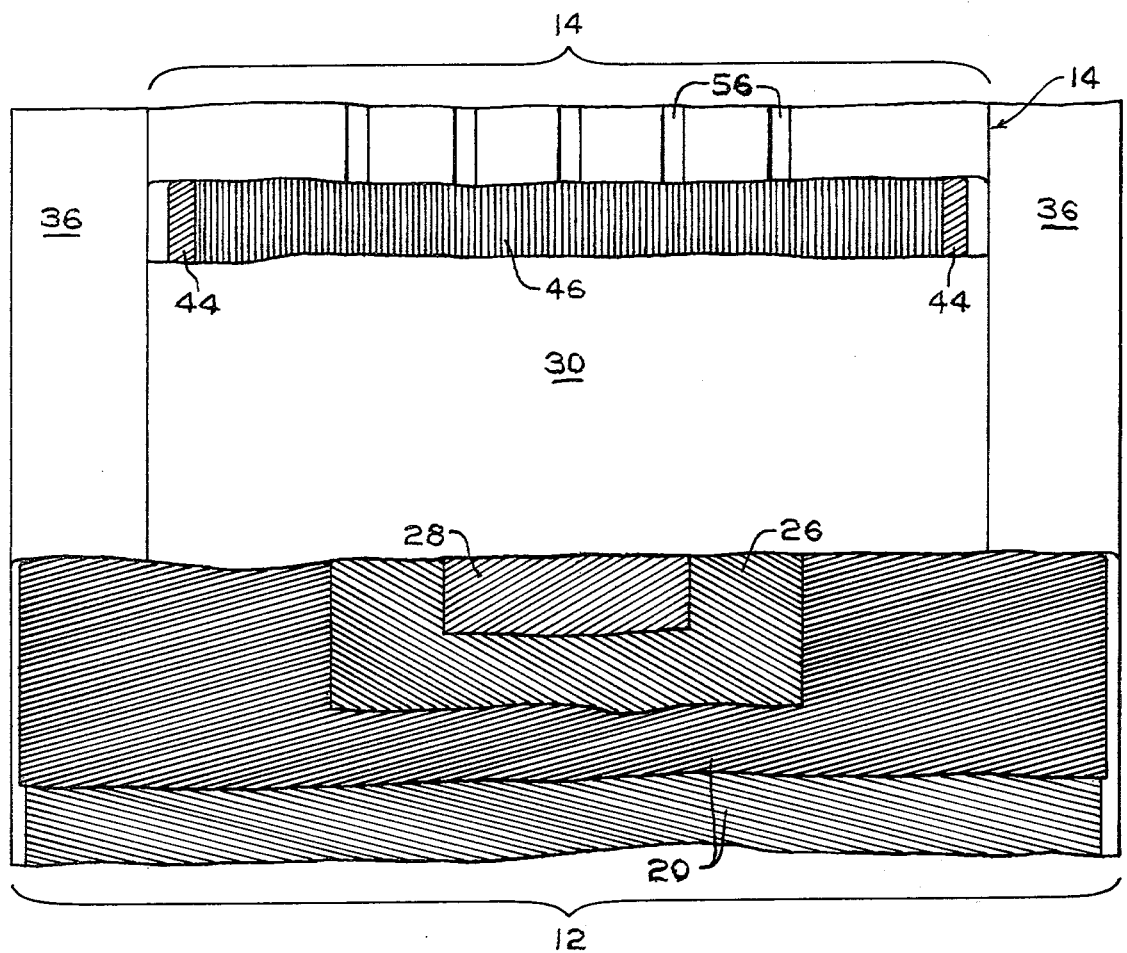
FIG. 3 is a plan view of the tire carcass and tread with parts broken away to show internal constructions thereof.

As shown in both figures of the drawings, the replaceable tread tire assembly 10 includes a generally toroidally shaped carcass section 12 and an annular band shaped replaceable tread portion 14. Carcass 12 includes a pair of spaced beads 16 for mounting the tire on a wheel. According to the instant preferred embodiment, each bead is shown as including three individual bead wire cores 24 making the preferred embodiment of the invention particularly well suited for aircraft usage. The wire cores are each made of rubber coated wires wound to constitute the core. The cores are each then encased in a flipper 18 with a filler rubber.

Extending from bead to bead are a plurality of carcass plies 20 to add strength and rigidity to the carcass. Each of the plies 20 includes a plurality of parallel reinforcing cords, preferably formed of polyamide, encased in a rubber layer in the conventional manner. Two superimposed plies then form a band with their ply cords angled in a crossed fashion. In the illustrated embodiment, twelve carcass plies, two plies to a band, are indicated although a greater or lesser number may be employed to provide a tire of desired size and load carrying capacity.

In the construction of the carcass, it is preferred to sequentially wrap the first two bands, or four plies, upon a cylindrical tire building drum and then place the first set of flippered bead cores adjacent the edges of the plies and turn up the first four plies to encase the core and flipper. The next two plies or single band are then positioned over the first four. The second set of flippered bead cores are placed on the plies and then turned up. The next four plies are similarly placed over the prior plies, and the end portions are turned up over the third set of flippered bead cores. A last carcass band of two additional plies is then utilized in a turned down orientation to encompass all three bead cores.

Prior to building up the layers of plies to create the carcass, an air impervious liner 22 in the form of one or more layers of elastomer is placed upon the building drum to constitute the interior of the carcass. This liner includes a first strip extending across the carcass crown and a second strip extending bead to bead.

Prior to removing the carcass from the building drum, two supplemental plies 26 and 28 of rubber coated cords, preferably polyamide, are placed across the crown 30, which is that portion of the carcass opposite the beads. The cords in 26 and 28 are at 60° with respect to the direction of intended tire rotation. The first or radially inner supplemental ply 26 extends the majority of the way across the crown but not through the sidewalls 32, the sidewalls being designated as the portions of the carcass between the beads 16 and crown 30. The second or upper 60° ply 28 only extends a minor portion of the width of the crown at the central area thereof.

A tread strip is then placed over the built up carcass. Additional rubber strips are preferably also added to the carcass prior to curing to accommodate the shoulder build-up and minimize rubber flow during curing.

During the curing stage, shoulder steps 34 near the edges of the crown portion are molded to constitute tread locating marks for ease of application and precise positioning of the tread band on the carcass. Further, the mold is of such nature as to create built-up shoulder portions 36 at the edges of the crown to maintain a smooth, continuous, relatively flat cross-sectional configuration of the tread band engaging face of the carcass extending across the crown and shoulders.

The overall cross-sectional profile of the cured carcass may be defined as elliptical with an aspect ratio, or ratio of the height of the tire at its highest point as compared to its width at its widest point of 0.50 to 0.85. The outer crown portion of the carcass, which constitutes the interface with the replaceable tread band, should be relatively flat. A radius of curvature of 750% of the inflated tire section width is optimum with an acceptable range being from 500% to infinity, i.e., flat.

In the preferred embodiment, the cords of the carcass plies are disposed preferably at about 83° from the intended direction of tire rotation, when in the green or uncured state. After curing into the generally toroidal configuration, the carcass cords will have an angle of about 75°, having been shaped by the mold. While it would seem desirable to have the carcass plies at 90°, fabrication difficulties of such orientation have led to the utilization of slightly lower angles, as utilized herein. 0° carcass plies are unacceptable for the instant application due to the fact that there could be no expansion in the sidewalls to maintain the proper orientation at the interface of the carcass and replaceable tread bands. Carcass plies of 90° are normal for most passenger radial tires today, whereas conventional bias ply tires position their carcass plies at about 30° to 50°, an orientation much less than that desired in accordance with the present invention.

The mating tread band 14 is also constructed of rubber with radially inward built-up plies. In the preferred mode, the tread rubber should be less abrasion resistant than the rubber of the carcass. The first step in generating the tread band includes the use of a gum filler-like material or liner 40 as the inner surface of the tread band. Relatively narrow bias cord plies encased in rubber are then positioned adjacent the edges of the liner, the first two edge plies 42 being for rigidity and the second two edge plies 44 for encompassing the edges of the remaining plies. Additional wedge shaped rubber shoulder strips are located between plies 42 and 44 to enlarge the tread edges. These edge plies have cords at about 60°.

A ply 38 of rubber-coated cords, which preferably are polyamide, disposed at 90° is then built-up upon the four first-mentioned narrow bias plies 42 and 44 to add rigidity to the tread during fabrication and subsequent handling. A plurality of rubber-coated cords, preferably aramid, disposed at 0° are then built-up in the tread band. Preferably, five of such plies 46, extending full width are employed to give sufficient strength to the tread band. Two narrow 0° aramid plies 48 and 50 are then placed adjacent the central portion of the tread band followed by a full width 0° ply 52 of polyamide cord. The previously mentioned biased edge plies 44 are then turned up around the built-up assembly of belted plies for encasement. The tread band thus takes a cylindrical or band shape with an elongated cross-sectional configuration.

The appropriate layer of tread rubber 54 is then placed over the assembly whereafter the tread band may be cured into a shape including traction grooves 56 and a lower profile or face paralleling the upper crown surface of the carcass for a smooth mating engagement. The mold is constructed for curing the tread band into proper orientation with the edge segments 58 of the tread bands being substantially twice the thickness of the tread band in its central portion to accentuate the smooth flat nature of the interface between tread band and carcass during operation.

The rubber of the carcass is preferably a blend of elastomers customarily employed for that purpose with the predominant component preferably being natural rubber. The tread is preferably constructed of a blend of natural and synthetic rubbers formulated for superior wear resistance. The carcass ply cords are preferably polyamide as noted above.

The high angle of the ply cords in the carcass tends to permit the application of pressure smoothly along the interface between the tread band and carcass. If the carcass plies were 90°, the carcass would have a tendency under inflation pressure to go to a fully toroidal configuration and the shoulder build-up would have to be much greater. If the carcass ply angles were 0°, there would be no expansion at all. But the elliptical configuration in combination with the high angle carcass cord bias permits a high contact area, even pressure situation, for improved holding of tread band by the inflated carcass. No mating indentations and projections in the carcass-tread band interface are required. The even pressure at the smooth, flat interface is important for the present invention since it is not desired to have a circular cross-section as in a conventional radial unbelted carcass. In such case higher pressure would occur at the center line of the interface as compared with the edges to permit tread band shifting under lateral loads. The high build-up of rubber in the shoulder areas accentuates this smoothness of pressure application across the area of contact between the mating parts.

A zero ply steer construction in the tread band is extremely desirable to eliminate the side shifting of the tread band on the carcass in the axial direction upon non-lateral load forces.

In operation, increased inflation pressures have been found desirable to compensate for reduced air volume at constant tire section width. As can be readily understood, the present invention is particularly well suited for replaceable treads on carcasses particularly in the aircraft industry wherein zero ply tread band construction is more accepted due to reduced vehicle turning and lateral tire forces during operation.

While the instant invention is described above with regard to a preferred embodiment, it is intended to be covered broadly within the spirit and scope of the appended claims.

What is claimed is:

1. A pneumatic tire assembly including:

a generally toroidal carcass portion having axially spaced beads, radially outwardly extending sidewalls, a crown section and carcass shoulders intermediate the sidewalls and crown section, said carcass shoulders being built-up and enlarged with respect to said crown section, said carcass having high angle bias ply cords of about 75° with respect to the intended direction of tire rotation and extending from bead to bead and defining an ovate cross-sectional configuration with a relatively flat, continuous, upper surface extending entirely across the crown and carcass shoulders to define a tread receiving area, and a generally cylindrical replaceable tread portion removably mounted upon the upper surface of said carcass portion, said tread portion having a central area and tread shoulders extending from the edges of the tread portion, said tread shoulders being built-up and enlarged with respect to the rest of the tread portion, said tread portion also including a plurality of layers of ply cords extending entirely across said tread portion at 0° from the intended direction of tire rotation, the tread portion defining an axially elongated cross-sectional configuration with a relatively flat, continuous radially inner surface across its entire width to constitute an area for mounting upon the tread receiving area of said carcass portion with the carcass shoulders in overlying contact with said tread shoulders and with the interface of said carcass portion and said tread portion defining in cross-section a radius of curvature of from about 500% to infinity of the inflated carcass section width at its widest dimension whereby said replaceable tread portion is maintained on said carcass portion during use by inflation pressure within said carcass portion.

* * * * *